Sept. 10, 1946.  J. KUTTNER  2,407,429
WRIST PIN ASSEMBLY
Filed May 19, 1944
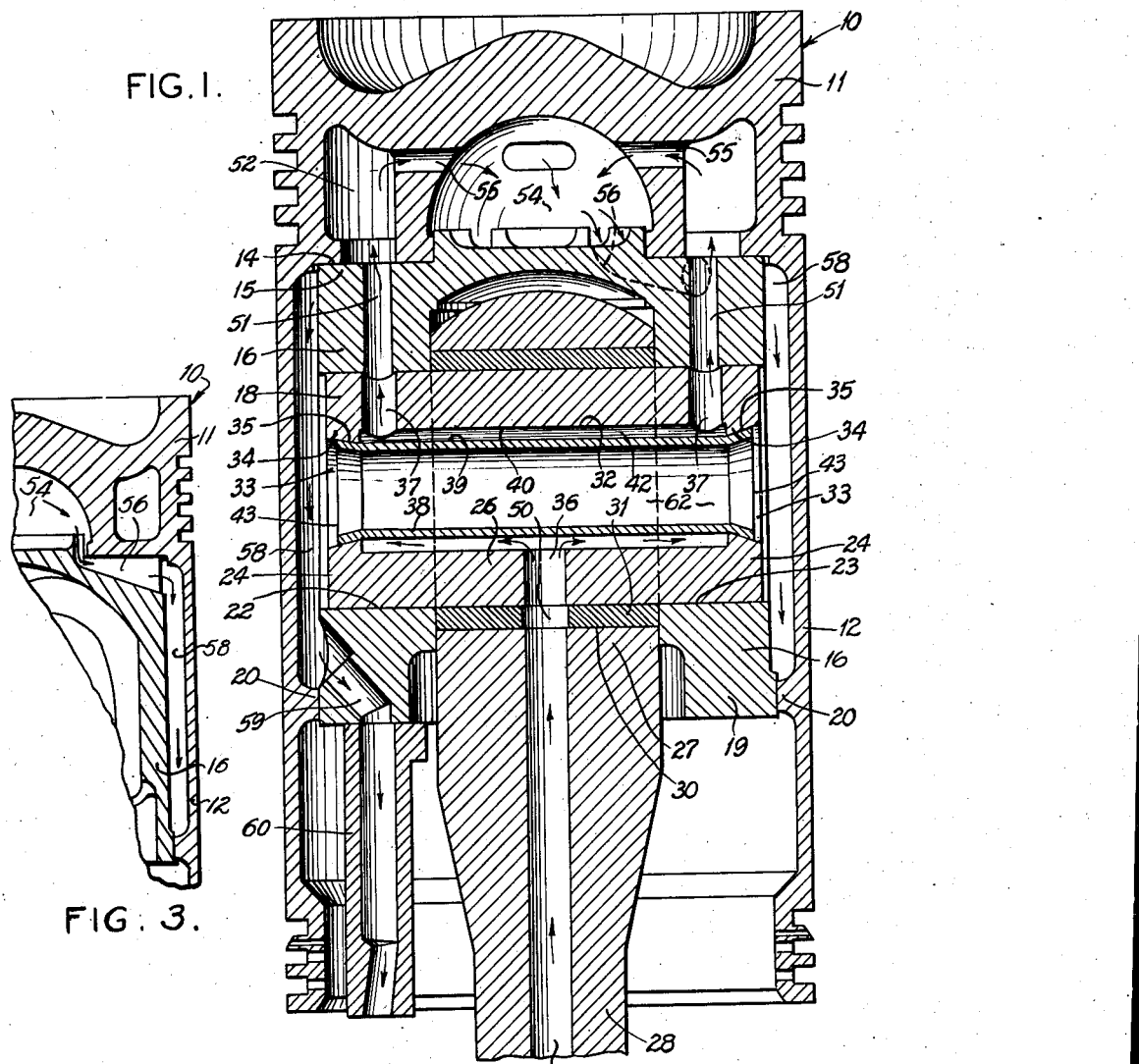
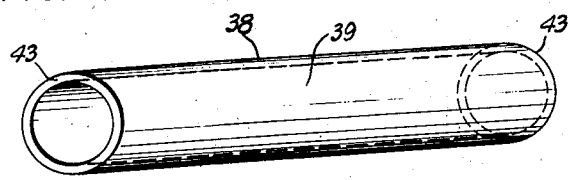
INVENTOR:
JULIUS KUTTNER
ATTORNEY Patented Sept. 10, 1946

2,407,429

UNITED STATES PATENT OFFICE 2,407,429

WRIST PIN ASSEMBLY

Julius Kuttner, Beloit, Wis., assignor to Fairbanks, Morse & Co., Chicago, Ill., a corporation of Illinois Application May 19, 1944, Serial No. 536,395

3 Claims. (Cl. 309—6)

This invention relates generally to pistons for internal combustion engines and the like, and has particular reference to improvements in the construction of a wrist pin assembly suitable for use in pistons of fluid-cooled character.

A principal object of the present invention resides in the provision of an improved wrist pin assembly for pistons of a type providing for circulation of a cooling fluid interiorly of the piston, wherein the wrist pin is interiorly chambered and includes provisions for connecting the chambered portion thereof in the circulating system of the piston, whereby to afford passage of cooling fluid through the pin for effecting a desired degree of wrist-pin cooling; chambering of the wrist pin according to present improvements, being effected by an axial bore in the wrist pin, and a tubular member of smaller outer diameter than the diameter of the pin bore, arranged longitudinally in and substantially coaxially of the pin bore, and effectively secured therein by deformation or uniform radial expansion of its end portions into pressed or frictional, fluid-sealing engagement with adjacent surface portions of the pin, the expanded end portions in coaction with the pin surfaces engaged thereby, thus constituting the sole means of assembly mounting and positioning of the tubular member in the wrist pin, and serving additionally, as fluid-sealed end-closures for the pin chamber as defined by the walls of the pin bore and said tubular member.

Another object is to provide a wrist pin assembly of a character and for the purpose described, which by the improved construction above indicated and hereinafter to be more fully described, may be produced with marked economy in number of parts and in manufacturing and assembling operations, and wherein the provision for self-securement of the tubular member to the wrist pin by its end portions deformed or expanded in situ, into firm frictional engagement with surfaces of the latter, is of particular advantage in the avoidance of separate means or elements of securement therefor, such as screws, pins, clamps, threaded collars or plugs, and the like.

Further objects and advantages attending the present improvements will appear readily from the following description of a presently preferred embodiment of the invention as exemplified in the accompanying drawing, wherein:

Fig. 1 is a longitudinal sectional elevation of a piston assembly embodying the present improvements, Fig. 2 is a view in perspective, of a tubular element employed in the improved wrist pin construction, illustrating the form thereof prior to its assembly to the wrist pin, and Fig. 3 is a reduced, fragmentary sectional view of the piston assembly.

Referring to the drawing by appropriate characters of reference, there is illustrated a piston 10 of an internally fluid-cooled type, providing a piston head 11 and an extended skirt 12, the head 11 having an interior annular seating surface 14 for seating thereagainst, the inner end 15 of a piston insert or frame member 16 adapted for the support of a wrist pin 18. The insert 16 received in the piston skirt 12 as shown, and supported against lateral displacement at its lower or outer end 19 by an internal skirt flange or rib 20, is suitably rigidly secured to the piston, preferably to the piston head 11, as by studs or bolts not shown.

Piston insert or frame 16 provides coaxial bores 22 and 23 at opposite sides thereof, to receive and seat therein the ends 24 of wrist pin 18, the pin ends preferably having a press-fit in the mounting bores of the frame so as to be fixed against displacement relative to the frame. Moreover, the frame is of a skeletonized character, to expose the central axial section 26 of the wrist pin, upon which is journaled the wrist pin bearing end 27 of the piston connecting rod 28. As shown, the pin bore 30 of rod 28 carries or is lined with a bearing element 31 of suitable bearing material, as Babbitt metal or the like, or such bearing element may be of roller or needle bearing character, if preferred.

Turning now to the wrist pin construction and to the features thereof constituting the present improvements, the wrist pin is interiorly chambered substantially as illustrated, for a purpose to be hereinafter fully described. As shown, the pin is provided with a centrally longitudinal or axial bore 32 open at the pin ends 24 through axial passages 33 of reduced diameter, effected by annular pin shoulders 34 internally of the bore ends. Moreover and for a purpose presently to appear, each shoulder 34 has the circular wall 35 thereof defining the passage 33, outwardly tapered to a predetermined degree, substantially as illustrated. Communicating with the pin bore 32 at a point therein substantially midway between the pin ends 24, is a fluid inlet passage 36 extending radially through the wall of the pin, the wrist pin further having in the diametrically opposite portion of the pin wall and inwardly adjacent each pin shoulder 34, an outlet passage 37 for the bore 32, extending radially through the wall as shown.

Provided for insertion in the pin bore, is a tubular member or chamber-forming insert 38 which by preference and prior to its assembly to the pin, has the general shape shown in perspective by Fig. 2. The member 38 may be obtained from metallic tube stock of proper size, cut to the desired length which in the present example, may and will approximate the overall length of the wrist pin. As appears from the assembly view of Fig. 1, the member 38 is formed from tubular stock having an outer diameter substantially or appreciably less than the diameter of the wrist pin bore, so that in final assembly attained in a manner presently to be described, the tubular member as disposed with its axis substantially coincident with the axis of the bore 32 and thus having its outer surface 39 spaced from the wall surfaces 40 of the pin bore, thereby serves to define an annular, longitudinally extending chamber 42 between the tube and bore.

It is important to the present improvements, that the metallic material of the tubular member 38 be of a readily deformable character, with the further characterization of ready deformability to an appreciable degree without resulting in splitting, cracking or other rupture in the zones of deformation. The reason for this will appear readily from the improved manner of locating and mounting the tube in the pin bore, as will be now described.

The tubular member 38 initially of the general configuration shown by Fig. 2, is inserted through the pin bore 32 and centered longitudinally therein with its end portions 43 in the bore passages 33, following which the tube ends 43 are uniformly circumferentially deformed or expanded into firm frictional engagement with the overlying tapered walls 35 of the pin shoulders 34, expansion of the tube ends being effected preferably simultaneously and by suitable, well-known means not here necessary to be illustrated. In consequence of such tube deformation, as to bring the peripheral surfaces of the tube ends 43 into positive, frictional surface abutment with the overlying wall surfaces 35 of the wrist pin passages 33, the tube is firmly secured to the pin, in a position coaxially of the pin bore 32 such as to define between the surfaces of the tube and pin bore, the annular chamber 42 hereinbefore mentioned. Moreover, the tube ends 43 together with the pin shoulders 34, provide and constitute end-closures for the chamber 42, with fluid-leakage effectively prevented in the zones of the closures by the fluid-sealing contact of the tube end portions with the pin wall surfaces 35, resulting from the expansion of the tube ends as described.

The tubular member 38 thus assembled to the wrist pin and defining the annular chamber 42 in and extending longitudinally of the pin bore 32, serves most effectively to confine cooling fluid admitted to the chamber 42 as hereinafter described, to a circulation of the fluid circumferentially of the tube and in direct flow-contact with the surfaces of the pin bore, whereby to assure the desired cooling of the wrist pin in normal operation of the piston.

Briefly describing the piston fluid circulating system as illustrated, cooling fluid as oil which may be supplied from the engine lubricating system (not shown), is conducted under suitable pressure, through a longitudinal conduit or bore 48 provided in the connecting rod 28, for delivery to the chamber 42 in the wrist pin, the rod bore being in communication with the wrist pin inlet passage 36 in all operative positions of the connecting rod journal end 27 angularly relative to the wrist pin 18, through an enlarged port 50 formed in the rod bearing sleeve or lining 31. Cooling oil thus admitted to the chamber 42, is circulated therethrough in pin-cooling contact with the surfaces of the wrist pin bore 32, and thence is discharged through the chamber outlet passages 37 and conducted from the latter, through passages 51 provided in the piston insert or frame 16, to an annular cooling chamber 52 formed in the head section 11 of the piston. It is to be noted that the outlet passages 37 communicate with the pin chamber 42 inwardly adjacent the pin shoulders 34, so that circulation longitudinally of the chamber 42 is thus attained, to assure adequate cooling of the wrist pin.

Provided in the piston head section 11 is a central pocket or chamber 54, which receives cooling oil from the surrounding head chamber 52 through passages 55 preferably located between the upper zones of the chambers, as shown. From the head chamber 54, the oil flows downwardly and outwardly through passages 56 (one thereof shown in broken outline in Fig. 1) formed in part, in the inner portion of the frame 16, into an annular chamber 58 between the piston skirt 12 and the frame insert 16, as such is illustrated as to one passage, in Fig. 3. Oil collecting in the latter chamber and prevented from flowing past the seating zone of the lower frame end 19 on the skirt rib 20 by fluid-sealing abutment of these parts, is discharged therefrom through a passage 59 in the outer or lower end 19 of the frame 16, and a communicating nozzle-like conduit element 60 suitably carried by frame 16 and projecting to the free end of the piston skirt 12, the oil discharging freely from the nozzle-conduit 60, and ultimately collecting in the oil sump in the engine crankcase (not shown). As will be noted from Fig. 1, the tubular member 38 defining the chamber 42 in the wrist pin 18, also provides by reason of its tubular form, a central chamber or bore 62 therethrough, opening through the deformed tube ends 43, to the annular skirt chamber 58. While the oil delivered to chamber 58 flows, in major part at least, around the annular chamber to the discharge passage 59, some portion thereof may pass through the tube bore 62 from the right-hand zone of skirt chamber 58 as viewed in Fig. 1, which is remote from the outlet passage 59.

Assembly of the tubular member 38 to the wrist pin 18 in the improved manner now fully described, presents features of improvement contributing markedly to the facility and economy of assembly and economy of parts required in the production of the chambered wrist pin structure. Among other advantages now readily appearing, the single-piece tube 38 self-secured in the pin bore 32 by expansion of its ends into secure frictional engagement with surface portions of the pin shoulders 34, thereby avoids any necessity for employing separate attaching or mounting elements, such as pins, bolts, screw plugs or the like.

Although the present description relates to a preferred embodiment of the invention as illustrated, it is to be understood that some modifications in parts and manner of assembly of the wrist pin structure, may be made without departing from the spirit and intended scope of the invention, as hereinafter claimed.

I claim:

1. In a skirted piston assembly of fluid-cooled character, including a wrist pin supporting member mounted wholly within the piston skirt and cooperating with the latter to form an annular skirt chamber, the combination of a wrist pin carried by the supporting member and provided with a bore longitudinally therein, said pin providing shoulders adjacent the bore ends, a tubular member arranged longitudinally in said bore to define therewith, a fluid chamber between said tubular member and the wall of the bore, said pin having fluid inlet and outlet passage means communicating with said chamber, and means for securing the tubular member to said pin, constituted solely by the end portions of the tubular member uniformly outwardly expanded into frictional, fluid-sealing surface engagement with said pin shoulders, said expanded ends in coaction with said shoulders, further providing end-closures for said chamber, and said tubular member defining a passage therethrough open at its ends to said skirt chamber.

2. A wrist pin structure for a piston of fluid-cooled type, comprising a wrist pin having a bore axially therein and formed to provide in each end of the bore, an internally projecting shoulder providing a circular wall surface tapered longitudinally of the bore, a tubular member having an outer diameter substantially less than the diameter of the pin bore, provided for positionment substantially coaxially in said pin bore, thereby to define substantially concentrically related, longitudinally extending chambers in the wrist pin, one thereof bounded by the tubular member and the wall of said pin bore, and the other formed solely by said tubular member, and means securing the member to the pin and coincidentally therewith, locating the member in said substantially coaxial position in the pin bore, said means being constituted solely by end portions of the tubular member deformed into pressed, fluid-sealing engagement with said tapered wall surfaces of said projecting shoulders, said deformed end portions in coaction with said shoulders, thereby serving to provide end-closures for one of said chambers.

3. A wrist pin structure for a piston of fluid-cooled type, comprising a wrist pin having a bore axially therein and formed to provide in each end of the bore, an annular shoulder presenting a circular wall surface tapered outwardly, longitudinally of the bore, a tubular member having an outer diameter substantially less than the diameter of the pin bore, provided for positionment in said pin bore, means securing the member to the pin and coincidentally therewith, locating the member substantially coaxially of the pin bore to define thereby, an axially extending, annular chamber bounded by said member and the wall of said bore, said means being constituted solely by end portions of said tubular member deformed into frictional, fluid-sealing engagement with the tapered wall surfaces of said shoulders, said deformed end portions in coaction with said shoulders, constituting end-closures for said chamber, the wrist pin being provided with fluid inlet and outlet passages communicating with said chamber, and the tubular member defining a passage therethrough, open at its ends.

JULIUS KUTTNER.